US011479421B2

United States Patent
Kiyohara et al.

(10) Patent No.: US 11,479,421 B2
(45) Date of Patent: Oct. 25, 2022

(54) CONTAINER TERMINAL OPERATION METHOD

(71) Applicants: JAPAN ASSOCIATION OF CARGO-HANDLING MACHINERY SYSTEMS, Tokyo (JP); MITSUI E&S MACHINERY CO., LTD., Tokyo (JP); JFE ENGINEERING CORPORATION, Tokyo (JP)

(72) Inventors: Hideto Kiyohara, Tokyo (JP); Tetsuya Shiraishi, Tokyo (JP); Hitoshi Noguchi, Tokyo (JP); Yoshiharu Yoshida, Tokyo (JP); Ryoma Inui, Tokyo (JP); Kenichi Murano, Tokyo (JP)

(73) Assignees: JAPAN ASSOCIATION OF CARGO-HANDLING MACHINERY SYSTEMS, Tokyo (JP); MITSUI E&S MACHINERY CO., LTD., Tokyo (JP); JFE ENGINEERING CORPORATION, Tokyo (JP)

( * ) Notice: Subject to any disclaimer, the term of this patent is extended or adjusted under 35 U.S.C. 154(b) by 464 days.

(21) Appl. No.: 16/486,260

(22) PCT Filed: May 17, 2019

(86) PCT No.: PCT/JP2019/019692
§ 371 (c)(1),
(2) Date: Aug. 15, 2019

(87) PCT Pub. No.: WO2020/110349
PCT Pub. Date: Jun. 4, 2020

(65) Prior Publication Data
US 2021/0354937 A1    Nov. 18, 2021

(30) Foreign Application Priority Data
Nov. 28, 2018  (JP) .............................. JP2018-222166

(51) Int. Cl.
*B65G 63/00* (2006.01)
*B65G 67/02* (2006.01)

(52) U.S. Cl.
CPC ............ *B65G 63/004* (2013.01); *B65G 67/02* (2013.01); *B65G 2201/0235* (2013.01); *B65G 2814/0397* (2013.01)

(58) Field of Classification Search
CPC ................. B65G 63/004; B65G 67/02; B65G 2201/0235; B65G 2814/0397
See application file for complete search history.

(56) References Cited

U.S. PATENT DOCUMENTS

| | | | |
|---|---|---|---|
| 9,862,557 B2 * | 1/2018 | Kasai | B65G 63/004 |
| 10,647,530 B2 * | 5/2020 | He | B65G 67/603 |

(Continued)

FOREIGN PATENT DOCUMENTS

| | | |
|---|---|---|
| JP | 2003-048625 A | 2/2003 |
| JP | 2006-282383 A | 10/2006 |

(Continued)

OTHER PUBLICATIONS

Mar. 17, 2020 Office Action issued in Japanese Patent Application No. 2018-222166.

(Continued)

*Primary Examiner* — Lynn E Schwenning
(74) *Attorney, Agent, or Firm* — Oliff PLC

(57) ABSTRACT

A container terminal operation method for a container terminal including a storage area in which a storage block is vertically arranged, wherein: a container conveying vehicle orbits through the storage block, apron, etc.; a container is handed over between the container conveying vehicle and the storage block on a lateral side thereof in a longitudinal direction; a handover area for handover of the container between the container conveying vehicle and an external (Continued)

vehicle, is defined in an area closer to a land than a land-side end; an external traveling lane is defined for the external vehicle; and the handover of the container in the handover area is carried out in a state where the container conveying vehicle and the external vehicle are both directed in a direction intersecting the longitudinal direction of the storage block.

4 Claims, 5 Drawing Sheets

(56) References Cited

U.S. PATENT DOCUMENTS

| | | | |
|---|---|---|---|
| 2008/0025825 A1* | 1/2008 | Fujiwara | B65G 63/004 378/57 |
| 2014/0079513 A1 | 3/2014 | Kasai et al. | |
| 2019/0016545 A1 | 1/2019 | He et al. | |

FOREIGN PATENT DOCUMENTS

| | | |
|---|---|---|
| JP | 2012-201482 A | 10/2012 |
| JP | 2015-196556 A | 11/2015 |
| JP | 2016-047765 A | 4/2016 |
| KR | 10-2018-0098322 A | 9/2018 |

OTHER PUBLICATIONS

Oct. 7, 2020 Office Action issued in Korean Patent Application No. 10-2019-7024615.

Apr. 6, 2021 Office Action issued in Chinese Patent Application No. 201980001211.8.

Jun. 1, 2021 Office Action issued in Korean Patent Application No. 10-2019-7024615.

* cited by examiner

CONTAINER TERMINAL OPERATION METHOD

TECHNICAL FIELD

The present invention relates to a container terminal operation method, and more specifically, a container terminal operation method which is favorable for improving the efficiency of container sorting in a storage area and the efficiency of container handover between the storage area and an external vehicle.

BACKGROUND ART

As for a container terminal operation method, in a container terminal such as those disclosed in patent literatures 1 and 2, storage blocks are arranged such that a traveling lane is configured to extend approximately perpendicularly to a quay wall. This arrangement form of the storage blocks is referred to as a vertical type, in contrast with a parallel type in which the storage blocks are arranged in parallel to the quay wall. The container terminal in which the storage blocks are thus arranged has, at a quay-wall-side end of each storage block, a loading/unloading area for an automatic conveyance carriage which travels in an area (apron) ranging from the end to a gantry crane, and at a land-side end of each storage block, a container handover area where a container is handed over to/from an external trailer.

In the container terminal such as those disclosed in patent literatures 1 and 2, reciprocating carriages which travel back and forth in the longitudinal direction along each storage block are allocated on both sides of the storage block, and a loading/unloading apparatus for loading/unloading a container between the storage block and the reciprocating carriage, is placed for each storage block. Additional loading/unloading apparatuses are placed in the handover areas located at both ends, in the longitudinal direction, of each storage block, such that a container is transferred between the reciprocating carriage and the automatic conveyance carriage, or between the reciprocating carriage and the external trailer.

CITATION LIST

Patent Literature

Patent Literature 1: Japanese Laid-open Patent Publication No. 2015-196556
Patent Literature 2: Japanese Laid-open Patent Publication No. 2016-47765

SUMMARY OF INVENTION

Technical Problem

In the container terminal such as those disclosed in above-mentioned patent literatures, in order to simplify a container conveying path, and in order to prevent external trailers (hereinafter, referred to as external vehicles) from entering the storage area, more apparatuses for loading/unloading and conveying containers, mainly including vehicles (hereinafter, referred to as container conveying vehicles) for conveying containers in the storage area, have been operated through automatic operation and remote control. However, since the vehicles such as the container conveying vehicles perform a reciprocating motion in the storage area, and most of the vehicles return unloaded after completing the conveyance of a container, there remains a problem in the conveyance efficiency. Besides, the handover area located at the land-side end of the storage area should have enough space for the external vehicle to execute a change of direction. Furthermore, a lag in the timing of the arrival of the external vehicle or a change of direction executed by the external vehicle may cause the occurrence of waiting time.

Accordingly, it is an object of the present invention to provide a container terminal operation method which eliminates the necessity for the container conveying vehicle to perform a reciprocating movement in the storage area, and the necessity for the external vehicle to execute a change of direction in the handover area, thereby enabling more efficient operation.

Solution to Problem

To attain the above-mentioned purpose, a container terminal operation method according to the present invention is an operation method for a container terminal including a vertical type storage area in which a storage block is arranged such that a traveling lane is formed from a quay wall toward a land side. The container terminal operation method includes: causing a container conveying vehicle to orbit through a lateral side, in a longitudinal direction, of the storage block, an area closer to a land than a land-side end of the storage block, and an apron; and handing a container over between the storage block and the container conveying vehicle on the lateral side in the longitudinal direction, wherein a handover area of the container between the container conveying vehicle and an external vehicle, is defined in the area closer to the land than the land-side end, a one-way external traveling lane for the external vehicle is defined from an entrance to an exit of the container terminal so as to pass through the handover area, and the handover of the container in the handover area is carried out in a state where both the container conveying vehicle and the external vehicle are directed in a direction intersecting the longitudinal direction of the storage block.

In the container terminal operation method having the above-mentioned feature, it is preferable that the handover area includes a container temporary storage area provided between a stop position of the container conveying vehicle and a stop position of the external vehicle such that the container is temporarily placed therein. This feature enables, even if there is a lag between the timing when the container conveying vehicle makes a stop and the timing when the external vehicle makes a stop, shortening of waiting time for the external vehicle and other vehicles caused by the lag, whereby more efficient operation can be achieved.

In the container terminal operation method having the above-mentioned feature, it is preferable that while the container conveying vehicle travels on the lateral side in the longitudinal direction of the storage block, the container conveying vehicle travels on different lateral sides when traveling toward the quay wall side and when traveling toward the land side. This feature allows the container conveying vehicle to repeat the handover of the container while orbiting an orbiting route. Besides, since there is substantially no vehicle coming in the opposite direction on the traveling lane, the container conveying vehicle does not have to make a way for other vehicles. Accordingly, an accident, for example, between the container conveying vehicles can be avoided in the storage area.

Advantageous Effects of Invention

In the container terminal operation method having the above-mentioned feature, the container conveying vehicle traveling through an orbiting route can perform the container handover from/to the storage block more than once, while making a single orbit. Furthermore, the necessity for the external vehicle to execute a change of direction in the handover area is eliminated, thereby enabling more efficient operation.

DESCRIPTION OF EMBODIMENTS

Hereinafter, an embodiment of a container terminal operation method according to the present invention will be described in detail with reference to the accompanying drawings. Note that the embodiment described below is merely one embodiment for favorably implementing the present invention. Therefore, even if any change is made to correspondence described therein within a range where an effect of the embodiment can be obtained, such a change can be construed as included in the scope of the present invention.

[Basic Operation Form]

Figure 1:
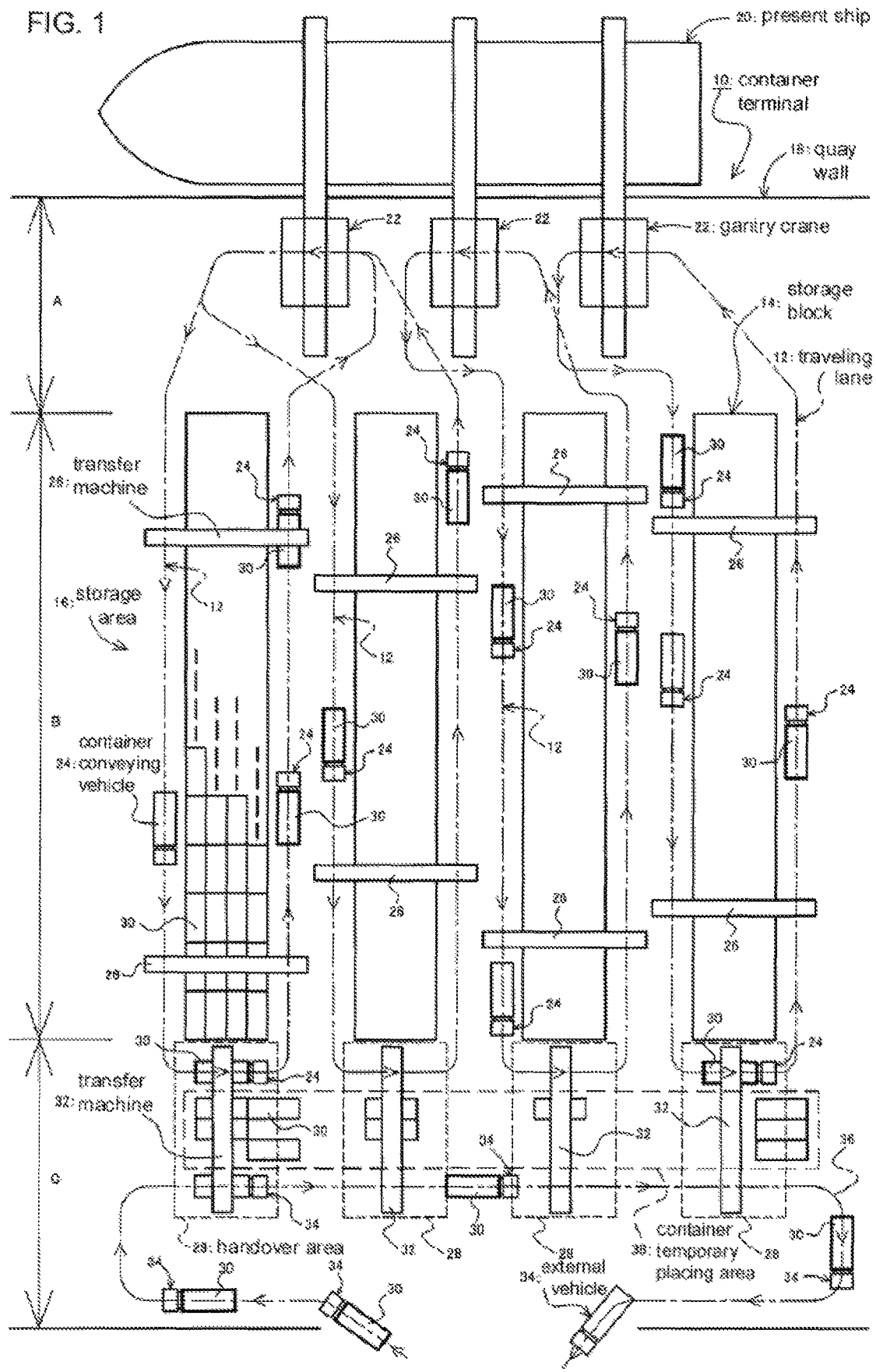
FIG. 1 is a schematic diagram showing a configuration of a container terminal for implementing the container terminal operation method according to the present invention.

A container terminal to which the container terminal operation method according to the present embodiment is applied, is a container terminal 10 having a so-called vertical type storage area in which storage blocks 14 are arranged such that traveling lanes 12 extend in a direction approximately perpendicular to a quay wall 18, as shown in FIG. 1. Note that, in the embodiment described below, an area (area corresponding to a range indicated by A) ranging from the quay wall 18 to the quay-wall-side end of a storage area 16 in FIG. 1 may be referred to as an "apron", the storage area 16 (area corresponding to a range indicated by B) in FIG. 1 may be referred to as an "inside of a yard", and an area which is closer to the land than the land-side end of the storage area 16 (area corresponding to a range indicated by C) in FIG. 1 may be referred to as an "external area".

A ship (present ship 20) to which or from which containers 30 are loaded or unloaded, is moored along the quay wall 18, and gantry cranes 22 are placed to perform a loading/unloading operation for the present ship 20. In the storage area 16, container conveying vehicles 24 and transfer machines 26 are deployed. In the external area located at the land-side end of the storage area 16, handover areas 28 are defined. In each handover area 28, a transfer machine 32 for transferring the containers is placed.

Figure 2:
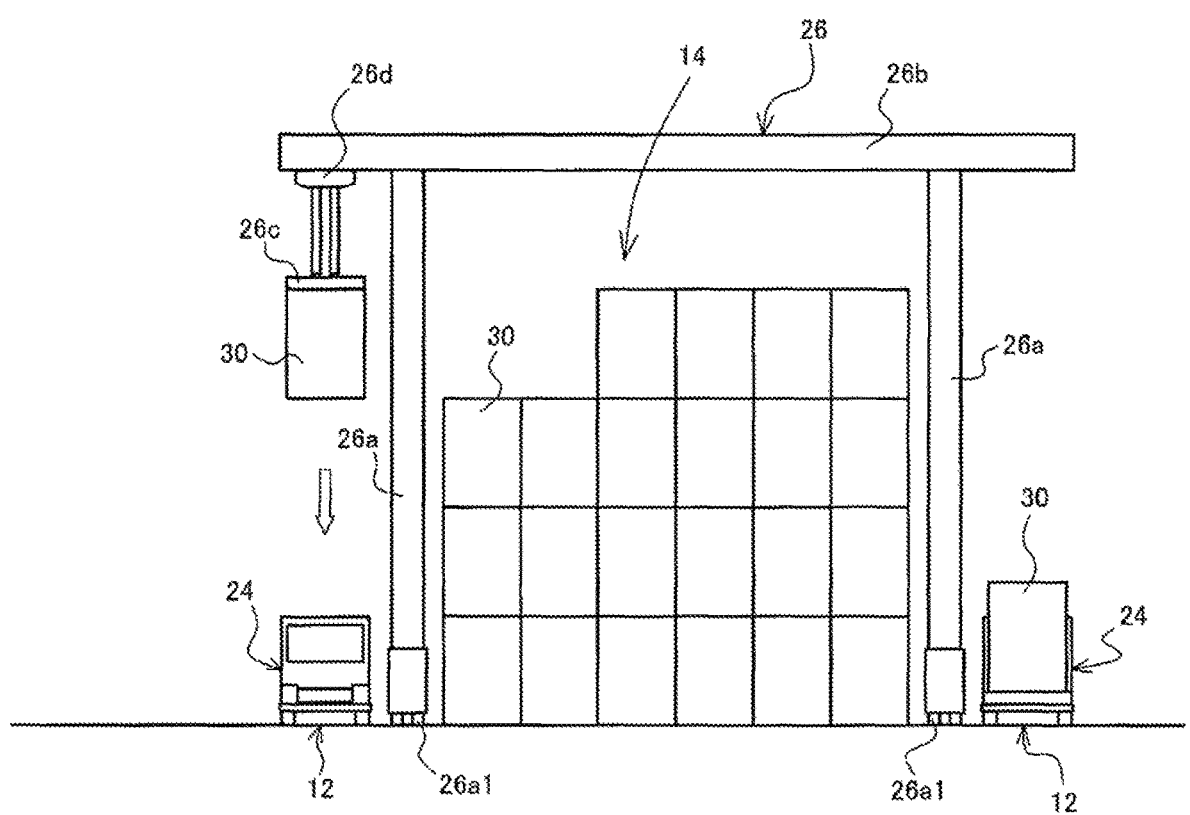
FIG. 2 is a diagram showing an example of handover of a container between a storage block and a container conveying vehicle.

Each container conveying vehicle 24 travels along the traveling lanes 12 which are formed on both lateral sides, in the longitudinal direction, of the storage block 14, and conveys the containers 30 to be handed over to/from the gantry crane 22, the transfer machines 26, and the transfer machine 32. The transfer machine 26 is configured, as shown in FIG. 2 showing an example of the front side configuration thereof, such that legs 26a are placed to straddle the storage block 14, and a girder 26b bridging between a pair of the legs 26a extends outward beyond the leg 26a, thereby enabling loading/unloading of a container to/from the container conveying vehicle 24 which travels on the outer side of the leg 26a. The girder 26b has a trolley 26d so as to be movable horizontally, and the trolley 26d moves a spreader 26c holding the container 30 along the girder, and also raises and lowers the spreader 26c. The legs 26a have traveling means 26a1 so as to be movable in a direction along an external traveling lane (longitudinal direction of a container temporary storage area). Note that the transfer machine 26 may be configured to be operable through remote control and automatic operation.

In the present embodiment, as indicated by alternate long and short dash lines in FIG. 1, the traveling lane 12 for the container conveying vehicle 24 traveling toward the land side (traveling from the apron to the external area) differs from the traveling lane 12 for the container conveying vehicle 24 traveling back to the quay wall side (traveling from the external area to the apron), that is, the respective traveling lanes are arranged on one lateral side and on the other lateral side of the storage block 14. By adopting such an orbiting type traveling method, it enables to arrange a plurality of container conveying vehicles 24 in one traveling lane 12 which used to be difficult when using the traveling lane 12 as a reciprocating route, and consequently the transportation efficiency is improved.

The allocation of the traveling lanes 12 to each storage block 14 allows two traveling lanes to be located between the adjacent storage blocks 14. Therefore, one container conveying vehicle 24 may be overtaken by another container conveying vehicle 24, whereby a traffic congestion caused by loading/unloading can be avoided. Note that the container conveying vehicle 24 according to the present embodiment is not limited to a manned trailer, but also includes an unmanned conveyance carriage such as an AGV. That is, the inside of the yard may be a manned area, or an unmanned area.

In the present embodiment, the container conveying vehicle 24 travels along one traveling lane 12 to reach the land-side end, and then makes a U-turn and travels along the other traveling lane 12 to return to the quay wall side, irrespective of whether or not the container 30 is loaded thereon. Even this operation form can be construed as included in the operation form according to the present embodiment, as long as the traveling lane 12 for the container conveying vehicle 24 is formed into an orbiting route such that the container conveying vehicle 24 travels along different traveling lanes 12 for a forward path and a return path.

Figure 3:
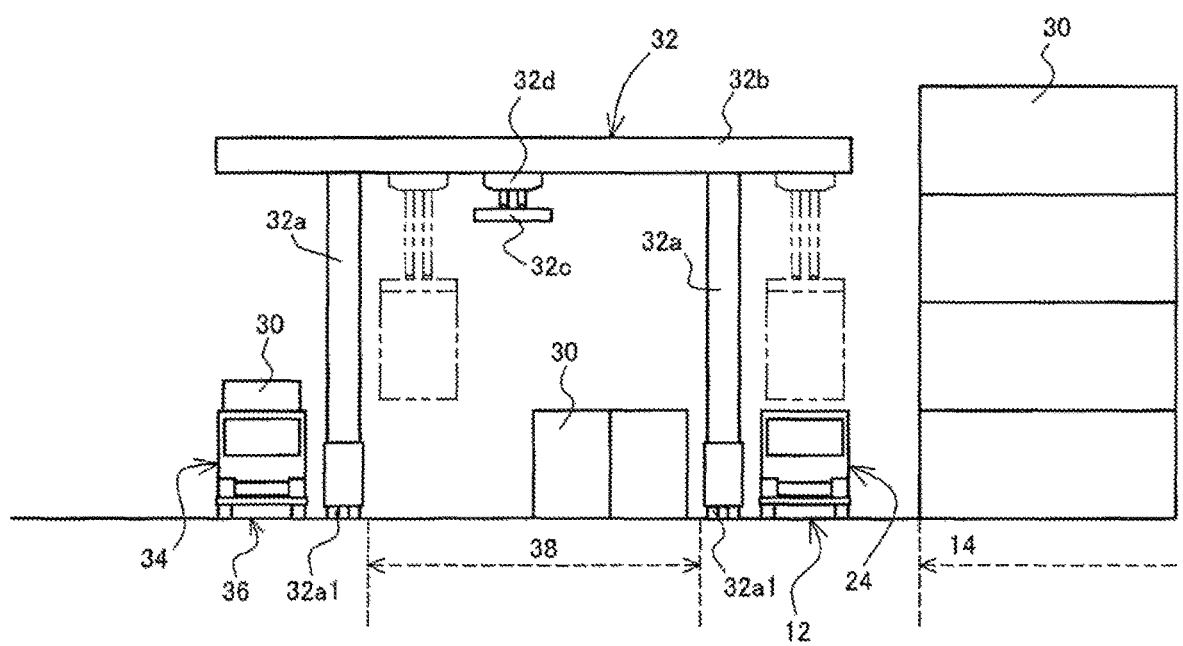
FIG. 3 is a diagram showing an example of a handover area including the storage block, a transfer machine, the container conveying vehicle, an external vehicle, and a temporary storage area.

As understood from FIG. 1, a stop site where an external vehicle 34 makes a stop in the handover area 28 is located near the land-side end of the storage block 14 where the container conveying vehicle 24 makes a U-turn. Here, the container conveying vehicle 24 making a stop in the handover area 28, and the external vehicle 34 making a stop in the handover area 28 are both directed in a direction intersecting the longitudinal direction of the storage block 14 (see FIG. 3).

By thus setting the direction for the vehicle stop, the external vehicle 34 does not have to change the vehicle direction (execute a change of direction) when entering a stop site. Therefore, it is unnecessary to provide space for the change of direction at the stop site. Besides, there is no waiting time, for the following vehicles, caused by the change of direction, whereby the container terminal 10 can be efficiently operated. In order to enable this operation, in the present embodiment, the traveling lane (external traveling lane 36) for the external vehicle 34 in the external area is formed into a one-way traveling lane extending from an entrance to an exit of the container terminal 10, thereby avoiding, for example, an accidental contact between vehicles and allowing the external vehicles 34 to travel smoothly.

Here, in the container terminal 10 according to the present embodiment, a container temporary storage area 38 is provided in the handover area 28 between a stop site for the container conveying vehicle 24 and a stop site for the external vehicle 34. The container temporary storage area 38 is an area where the containers 30 to be conveyed in or out are temporarily placed, for example, in a case where the timing when the container conveying vehicle 24 makes a stop does not match the timing when the external vehicle 34 makes a stop. Providing such a container temporary storage area 38 enables a reduction in the occurrence of waiting time caused by a lag in the timing between the container conveying vehicle 24 and the external vehicle 34.

Similar to the transfer machine 26 placed in the storage block 14, the transfer machine 32 placed in the handover area 28 is basically composed of a pair of legs 32a, a girder 32b, a spreader 32c, and a trolley 32d, and the legs 32a are provided with respective traveling means 32a1. Here, the pair of legs 32a are placed so as to straddle the temporary storage area 38, and the girder 32b bridges between the pair of legs 32a and also has an extended section on the outer side of the leg 32a. The spreader 32c is suspended from the trolley 32d which moves horizontally along the girder 32b, and is configured to hold the container 30.

[Operation Example of Container Conveyance]

As mentioned above, the container conveying vehicle 24 traveling along an orbiting route performs the container handover at a position directly underneath the gantry crane 22, on the traveling lanes 12 located on both lateral sides of the storage block 14, and in the handover area 28.

In the handover area 28, a traveling direction in which the container conveying vehicle 24 is directed when making a stop while making a U-turn on the traveling lane 12 extending along the storage block 14, and a traveling direction in which the external vehicle 34 is directed when making a stop while traveling along the external traveling lane, are identical to each other. Thus, the container 30 can be handed over between the vehicles by the transfer machine 32 having the girder 32b placed so as to straddle the container temporary storage area 38 in the longitudinal direction.

In a case where there is a lag between the timing when the container conveying vehicle 24 makes a stop in the handover area 28 and the timing when the external vehicle 34 makes a stop in the handover area 28, the container temporary storage area 38 is used. As a measure for a case where the container conveying vehicle 24 or the external vehicle 34 has a container 30 loaded thereon, the container temporary storage area 38 is used such that the loaded container is temporarily placed therein by the transfer machine 32.

On the other hand, when the container conveying vehicle 24 or the external vehicle 34 having no container 30 loaded thereon makes a stop in the handover area 28, if there is a container 30, in the container temporary storage area 38, to be conveyed in or out according to an instruction given thereto, the container 30 is picked up from the container temporary storage area 38 and loaded to the container conveying vehicle 24 or the external vehicle 34.

This operation method enables not only the container conveying vehicle 24 but also the external vehicle 34, to shorten waiting time at the time of handover of the container 30, whereby the container terminal 10 can be efficiently operated.

[Modification]

Figure 4:
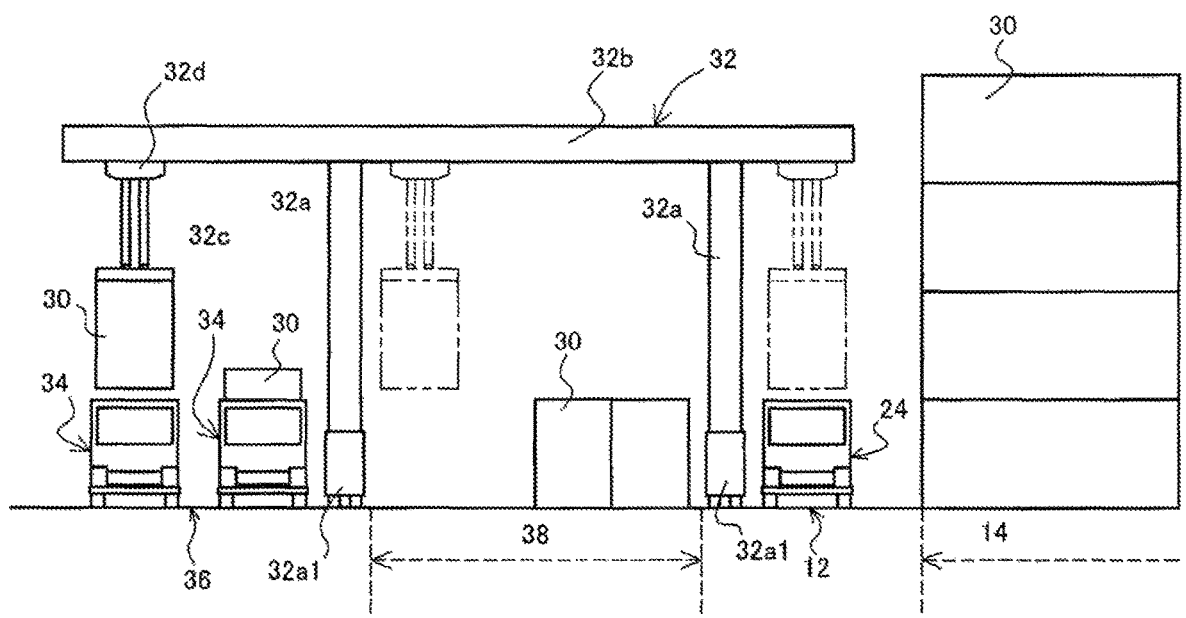
FIG. 4 is a diagram explanatorily showing an example of a case where the number of external traveling lanes is increased.

In the present embodiment, a traveling lane (external traveling lane 36) for the external vehicle 34 in the handover area 28 is illustrated as only one lane, for the convenience of explanation. However, when the container terminal operation method according to the present invention is implemented, two external traveling lanes 36 may be provided as shown in FIG. 4. The increasing number of the traveling lanes (external traveling lanes 36) for the external vehicles 34 relieves traffic congestion for the external vehicles 34 and also improves the usage frequency of the container temporary storage area 38. Accordingly, more efficient operation of the container terminal can be achieved.

Figure 5:
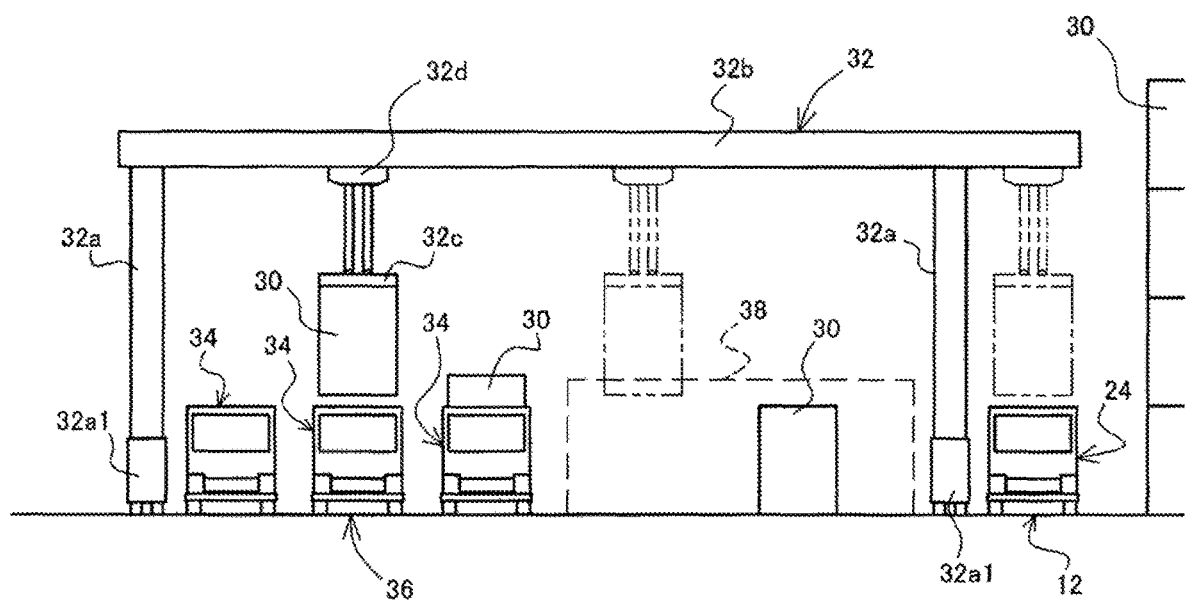
FIG. 5 is a diagram explanatorily showing a configuration example of a case where the external traveling lanes are located between legs of the transfer machine.

As shown in FIG. 5, the number of the external traveling lanes 36 can be further increased (the number of the external traveling lanes is three in an example illustrated in FIG. 5). When this operation form is used, it is preferable that each leg 32a of the transfer machine 32 is placed on the outer side of the external traveling lanes 36 as shown in FIG. 5, so as to reduce the overhanging length of the girder 32b. The reason therefor is as follows. When a heavy container 30 is suspended, the girder 32b on the outer side of the leg 32a is in a cantilever condition. If the length of the cantilever is set to be longer, a burden on the girder 32b becomes excessive, and the supporting state of the transfer machine 32 per se is likely to become unstable due to the lever principle.

Although not shown, it is obvious that the traveling lane 12 for the container conveying vehicle 24, in addition to the external traveling lanes 36, may be placed on the inner side of the pair of legs 32a. This is because, even if the transfer machine 32 having such a configuration is used, there is no influence on the implementation of the container terminal operation method according to the present invention.

[Effect]

As described above, the container terminal operation method according to the present invention eliminates the necessity for the external vehicle 34 to execute a change of direction in the handover area 28, thereby enabling more efficient operation.

REFERENCE SIGNS LIST

10 . . . container terminal, 12 . . . traveling lane, 14 . . . storage block, 16 . . . storage area, 18 . . . quay wall, 20 . . . present ship, 22 . . . gantry crane, 24 . . . container conveying vehicle, 26 . . . transfer machine, 26a . . . leg, 26a1 . . . traveling means, 26b . . . girder, 26c . . . spreader, 26d . . . trolley, 28 . . . handover area, 30 . . . container, 32 . . . transfer machine, 32a . . . leg, 32a1 . . . traveling means, 32b . . . girder, 32c . . . spreader, 32d . . . trolley, 34 . . . external vehicle, 36 . . . external traveling lane, 38 . . . container temporary storage area

The invention claimed is:

1. A container terminal operation method for a container terminal including a vertical storage area in which a storage block is arranged with a traveling lane from a quay wall toward land, the container terminal operation method comprising:

causing a container conveying vehicle to travel along a loop that includes
- a lateral side along a longitudinal direction of the storage block,
- an area closer to the land than an end of the storage block closest to the land, and
- an apron; and handing a container over between the storage block and the container conveying vehicle on the lateral side, wherein a first handover area of the container between the container conveying vehicle and an external vehicle is in the area closer to the land and a second handover area of the container between the container conveying vehicle and a ship is in the apron, a one-way external traveling lane for the external vehicle is from an entrance to an exit of the container terminal and passes through the first handover area, handover of the container in the first handover area occurs where both the container conveying vehicle and the external vehicle travel in a direction intersecting the longitudinal direction of the storage block; and the loop includes positions for the container conveying vehicle to perform handover of the container to or from each of the external vehicle, the storage block and the ship while traveling along the loop a single time.

2. The container terminal operation method according to claim 1, wherein the first handover area includes a container temporary storage area between a stop position of the container conveying vehicle and a stop position of the external vehicle.

3. The container terminal operation method according to claim 1, wherein the container conveying vehicle travels on different lateral sides of the longitudinal direction of the storage block when traveling toward the quay wall and when traveling toward the land.

4. The container terminal operation method according to claim 2, wherein the container conveying vehicle travels on different lateral sides of the longitudinal direction of the storage block when traveling toward the quay wall and when traveling toward the land.

* * * * *